E. L. & C. H. BOND.
FISH TURNER.
APPLICATION FILED JAN. 30, 1911.

1,005,590.

Patented Oct. 10, 1911.

Witnesses
Howard F. Costello.
Ross J. Woodward.

Inventors
Emilie L. Bond
Clarence H. Bond
By E. E. Crooman,
Attorney.

COLUMBIA PLANOGRAPH CO., WASHINGTON, D. C.

UNITED STATES PATENT OFFICE.

EMILIE L. BOND AND CLARENCE H. BOND, OF TRENTON, NEW JERSEY.

FISH-TURNER.

1,005,590.
Specification of Letters Patent.
Patented Oct. 10, 1911.

Application filed January 30, 1911. Serial No. 605,570.

*To all whom it may concern:*

Be it known that we, EMILIE L. BOND and CLARENCE H. BOND, citizens of the United States, residing at Trenton, in the county of Mercer and State of New Jersey, have invented certain new and useful Improvements in Fish-Turners, of which the following is a specification, reference being had therein to the accompanying drawing.

This invention relates to culinary implements which are used for turning frying fish when one side has been cooked and it is desired to turn the fish so that the other side can be cooked. It is intended to so construct this turner that the fish can be securely held and turned without any danger of dropping or breaking it.

The principal object of the invention is to provide a turner which has a pair of bracing bars which are fastened between the handles by a single bolt upon which the upper handle is pivoted so that the bars form a fulcrum upon which the pivoted handle rocks.

Figure 1:
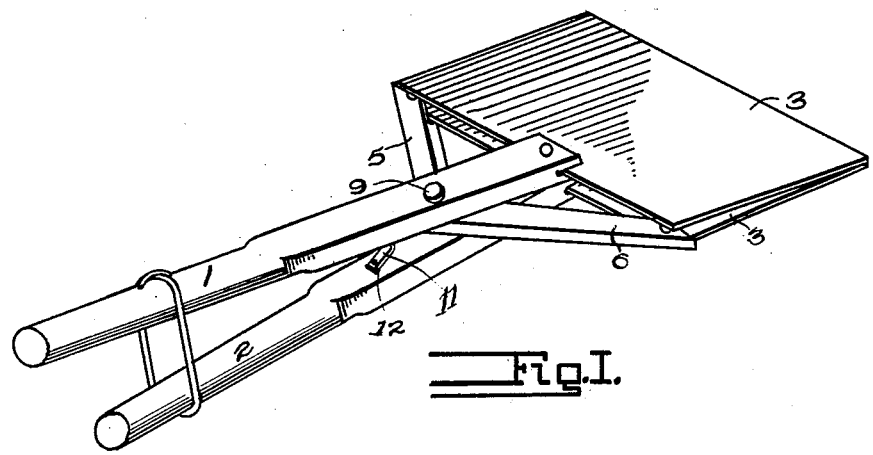
Figure 2:
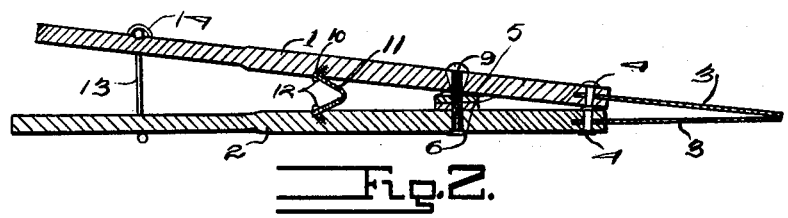
Figures 3, 4:
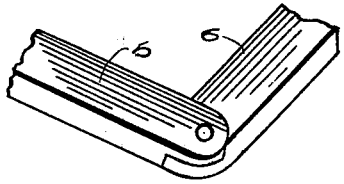

This invention is illustrated in the accompanying drawings, wherein:

Figure 1 is a perspective view of the improved turner. Fig. 2 is a longitudinal sectional view through the turner. Fig. 3 is an enlarged fragmentary view of the bracing bars. Fig. 4 is an enlarged fragmentary view of one of the bracing bars.

Referring to the accompanying drawings by numerals it will be seen that the improved turner comprises a pair of handles 1 and 2 which are provided with substantially circular grip portions, and are provided with rectangular forward portions which terminate in bifurcated ends. Each of the handles has mounted in its bifurcated end a plate 3 which is secured in place by means of the rivets 4 which securely hold the plates in position, and prevent them from having any movement. The lower plate is provided with bracing bars 5 and 6 which are provided with diagonal slots 7 in their ends in which the plate is secured by means of rivets which pass through openings 8. The bars are joined together at their free ends by means of the ordinary T-joint shown in Fig. 3, and are held together by means of a bolt 9 which passes through the rectangular portions of the handles 1 and 2. The openings in the handle 1 through which the securing bolt 9 passes is larger at its outer end than at its inner end to permit the handle to have a pivotal movement upon the bolt. The handles are provided to the rear of the pivotal point with sockets 10 in the inner surface in which there is mounted a flat spring 11 which is secured into place by means of the securing bolts 12. The circular portions of the handles are joined together by means of the link 13, which is held in place by means of the staple 14 secured to the handle 1. By means of this construction there is provided a turner which has a lower blade which is braced by means of the bars which are secured near their rear corners and there is thus prevented any danger of bending the blade if an unusually heavy fish were lifted. The upper plate fits within the bifurcated end of the handle 1, and is thus securely held in place, there being no need for the bracing bars in this blade as the weight of the fish is supported by the lower blade, and the upper blade simply holds the fish from slipping off while turning the same. The link 13 holds the handles in the proper position when the turner is being used, and also affords a convenient means for hanging the turner. By this construction it will also be seen that there is provided a turner which has its lower blade braced by a pair of arms which have their ends overlapped and secured between the two handles by a single bolt which passes through the handles and bars so that the upper blade is pivotally mounted upon the bolt and so that the crossed arms form a fulcrum upon which the handle rocks.

What we claim is:—

A fish turner comprising a pair of blades, a handle rigidly mounted upon each of said blades, a bracing bar secured at each of the rear corners of the lower one of said blades and having their inner ends joined together and positioned between said handles, and a pivot pin passing through said handles and the inner ends of said braces whereby the inner ends of said braces will form a fulcrum upon which the upper one of said handles is adapted to rock.

In testimony whereof we hereunto affix our signatures in presence of two witnesses.

EMILIE L. BOND.
CLARENCE H. BOND.

Witnesses:
MARION G. THOMPSON,
EDMUND WHITE.

Copies of this patent may be obtained for five cents each, by addressing the "Commissioner of Patents, Washington, D. C."